United States Patent
Yamase

[11] Patent Number: 5,740,697
[45] Date of Patent: Apr. 21, 1998

[54] LUBRICATION STRUCTURE FOR A TRANSFER MECHANISM

[75] Inventor: Tetsuo Yamase, Shizuoka-ken, Japan

[73] Assignee: Suzuki Motor Corporation, Shizuoka-ken, Japan

[21] Appl. No.: 717,512

[22] Filed: Sep. 20, 1996

[30] Foreign Application Priority Data

Mar. 29, 1996 [JP] Japan .................. 8-104224

[51] Int. Cl.$^6$ .............. F16H 37/06; F16H 57/04
[52] U.S. Cl. .......... 74/467; 74/665 GE; 74/607; 180/247; 227/18; 227/71; 384/13; 464/162
[58] Field of Search .............. 74/467, 665 GE, 74/607; 180/247; 277/18, 71; 384/13; 464/16, 162

[56] References Cited

U.S. PATENT DOCUMENTS

| | | | |
|---|---|---|---|
| 4,270,409 | 6/1981 | Glaze et al. | 180/247 X |
| 4,841,803 | 6/1989 | Hamano et al. | 74/665 GE |
| 5,522,477 | 6/1996 | Byrne | 74/467 X |

FOREIGN PATENT DOCUMENTS 62-18785  4/1987  Japan .
63-32651  6/1988  Japan .

*Primary Examiner*—Allan D. Herrmann
*Attorney, Agent, or Firm*—Flynn, Thiel, Boutell & Tanis, P.C.

[57] ABSTRACT

A lubrication structure for a transfer mechanism distributing a driving force received from a transmission gear to two output shafts and outputting the driving force therefrom, wherein the lubrication structure comprises a slide tube section for a sliding yoke provided in a propeller shaft, the slide tube section externally mounted on a shaft section of the output shaft in a state where it can move in the axial direction but cannot relatively rotate; a lubricating oil hole provided in an extended section of a transfer case covering the slide shaft section; a lubricating oil groove provided in an internal surface of the extended section and communicating with the lubricating oil hole, the lubricating oil groove oriented in the axial direction of the extended section; a seal mechanism sealing between the slide tube section on the internal surface of the extended section at the outer end thereof; and a bushing provided between the extended section and the slide tube section so that the bushing covers the lubricating oil groove; an edge of the lubricating oil groove at the inner end of the extended section being closed and an edge of the lubricating oil groove at the outer end of the extended section being open.

4 Claims, 6 Drawing Sheets

LUBRICATION STRUCTURE FOR A TRANSFER MECHANISM

FIELD OF THE INVENTION

The present invention relates to a lubrication structure for a transfer mechanism, and more particularly to a lubrication structure which can insure a lubricating capability of a sliding yoke with a bushing and without providing a bearing therein, thus allowing cost reduction, and which also can contribute to improvement of a seal function, rigidity of a bearing, prevention of attenuation due to vibration, and extension of life due to excellent lubricating capability.

BACKGROUND OF THE INVENTION

A four-wheel vehicle has a transfer mechanism for distributing a driving force received from a transmission gear connected to an internal combustion engine to front wheels as well as to rear wheels and outputting the driving force therefrom. The transfer mechanism had two output shafts, one of which delivers a driving force via a propeller shaft to rear wheels, and the other of which delivers a driving force via the propeller shaft to front wheels, the four wheels thus being driven.

The lubrication structure for a transfer mechanism as described above is shown in FIG. 5. In FIG. 5, a transfer mechanism 202 has two output shafts for distributing a driving force received from a transmission gear (not shown) and outputting therefrom. In FIG. 5, a rear output shaft 206, one of the two output shafts, is pivotally supported on the transfer mechanism case 204. The rear output shaft 206 has a rear sliding tube 212 for a rear sliding yoke 210 for a rear propeller shaft (not shown) engaged from outside in a rear slide shaft section 208 so that it can move in the axial direction but cannot rotate relatively against each other. A rear extended section 214 is provided on the transfer mechanism case or housing 204 so that the rear extended section 214 covers the rear slide shaft section 208.

A lubricating oil hole 216 communicating with an oil pool chamber 215 is formed in the rear extended section 214. A lubricating oil groove 220 communicating with the lubricating oil hole 216 and oriented in the axial direction is provided on an internal surface 218 of section 214. A staged or stepped mounting section 222 is provided in the outer side of the internal surface 218, and a seal mechanism 224 for sealing between housing section 214 and the rear slide tube section 212 is provided in the staged mounting section 222.

A rear bushing 226 is provided and set between the rear extended case section 214 and the rear slide tube section 212 so that it covers the lubricating oil groove 220. An oil hole 228 and an oil groove 230 are provided in the rear bushing 226. Lubricating oil led from the lubricating oil hole 216 in the rear extended case section 214 to the lubricating oil groove 220 is led from the oil hole in the rear bushing 226 to the oil groove 230 for lubricating the section between the rear bushing 226 and the rear slide tube section 212.

An example of a lubricating structure for a transfer mechanism as described above is disclosed in Japanese Patent Publication No. 18785/1987 or in Japanese Patent Publication No. 32651/1988.

The transfer mechanism disclosed in Japanese Patent Publication No. 18785/1987 has a large opening in the upstream side in the running direction of a chain transfer device connecting a rear wheel output shaft to a front wheel output shaft and making the two shafts run in correlation with an oil guide having an exit opened to a degree allowing gradual leak of oil provided in the downstream side in the running direction of the chain transfer device.

In the transfer mechanism disclosed in Japanese Patent Publication No. 32651/1988, a first output shaft and a second output shaft located in coaxial state are rotatably engaged in each other via a bearing. An oil guide path leading to the bearing is formed inside the output shaft, an oil scraping claw projecting from the output shaft is provided in the upstream side from an opening in the entrance of the oil guide path in the rotating direction of the shaft, and an oil band block is provided at a position close to a space in which the oil scraping claw pivots inside an extended housing covering the output shaft.

In the lubrication structure for the transfer mechanism 202 shown in FIG. 5, the rear bushing 226 is provided and set in a section between the rear extended case section 214 and the rear slide tube section 212 for centering the rear sliding yoke 210. For this reason, tolerance is very strict in the engaging section between the rear bushing 226 and the rear sliding yoke 210. Because the tolerance is strict as described above, in the lubrication structure for the transfer mechanism 202, the oil hole 228 and the oil groove 230 are provided in the rear bushing 226 for lubricating the section between the rear bushing 226 and the rear slide tube section 212.

As shown in FIG. 6, however, in a case where the oil hole 228 of the rear bushing 226 is offset against the lubricating oil hole 216 in the rear extended section 214, the lubricating oil escapes from the upmost end of the rear extended section 214, which impedes sufficient lubrication and disadvantageously causes burning or wear.

To overcome the disadvantages as described above, a rear bearing 234 is positioned between the rear extended section 214 of the transfer mechanism 202 and the rear slide tube section 212 as shown in FIG. 7 and FIG. 8. However, in this structure, use of the rear bearing 234 in place of the rear bushing 226 may cause increased cost.

It should be noted that, in FIG. 7, reference numeral 236 is an input shaft, 203 an array of low-speed/high-speed switch gears, 240 a front output shaft, 242 a driving sprocket, 244 a driven sprocket, 246 a chain, 248 a front slide shaft section, 250 a front sliding yoke, 252 a front slide tube section, and 254 a front extended case or housing section. In the front extended section 254, like in the rear extended section 214, a lubricating oil hole 256 and a lubricating oil groove 258 are provided, and a seal mechanism 260 is also provided therein. A front bearing 262 is provided and set in a section between the front extended section 254 and the front slide tube section 252.

SUMMARY OF THE INVENTION

To overcome the problems as described above, the present invention provides a transfer mechanism for distributing a driving force received from a transmission gear to two output shafts and outputting the driving force therefrom, comprising: a slide tube section for a sliding yoke provided on a propeller shaft, the slide tube section provided on and surrounding a slide shaft section of the output shaft in a state where it can move in the axial direction but cannot relatively rotate; a lubricating oil hole formed and provided in an extended section of a transfer case covering the slide shaft section; a lubricating oil groove communicating with the lubricating oil hole provided in an internal surface of the extended section, the lubricating oil groove oriented in the axial direction of the extended section; a seal mechanism sealing between the slide tube section and an internal surface of the extended section; and a bushing provided between the extended section and the slide tube section so that the bushing covers the lubricating oil groove; wherein an edge of the lubricating oil-groove at the inner end of the extended section is closed and an edge of the lubricating oil groove at the outer end of the extended section is open.

In the lubrication structure for a transfer mechanism according to the present invention, an edge of a lubricating oil groove formed in an extended section of a transfer case covering a slide shaft section of the output shaft located at the inner end of the extended section is closed and an edge of the lubricating oil groove at the outer end of the extended section oriented to the seal mechanism is opened, so that it is possible to prevent the lubricating oil from escaping from an edge of the lubricating oil groove at the inner end of the extended section even in a case where an oil hole in a bushing is offset against the lubricating oil hole in the extended section.

Next description is made for preferred embodiments of the present invention with reference to the related drawings.

DETAILED DESCRIPTION

Figure 1:
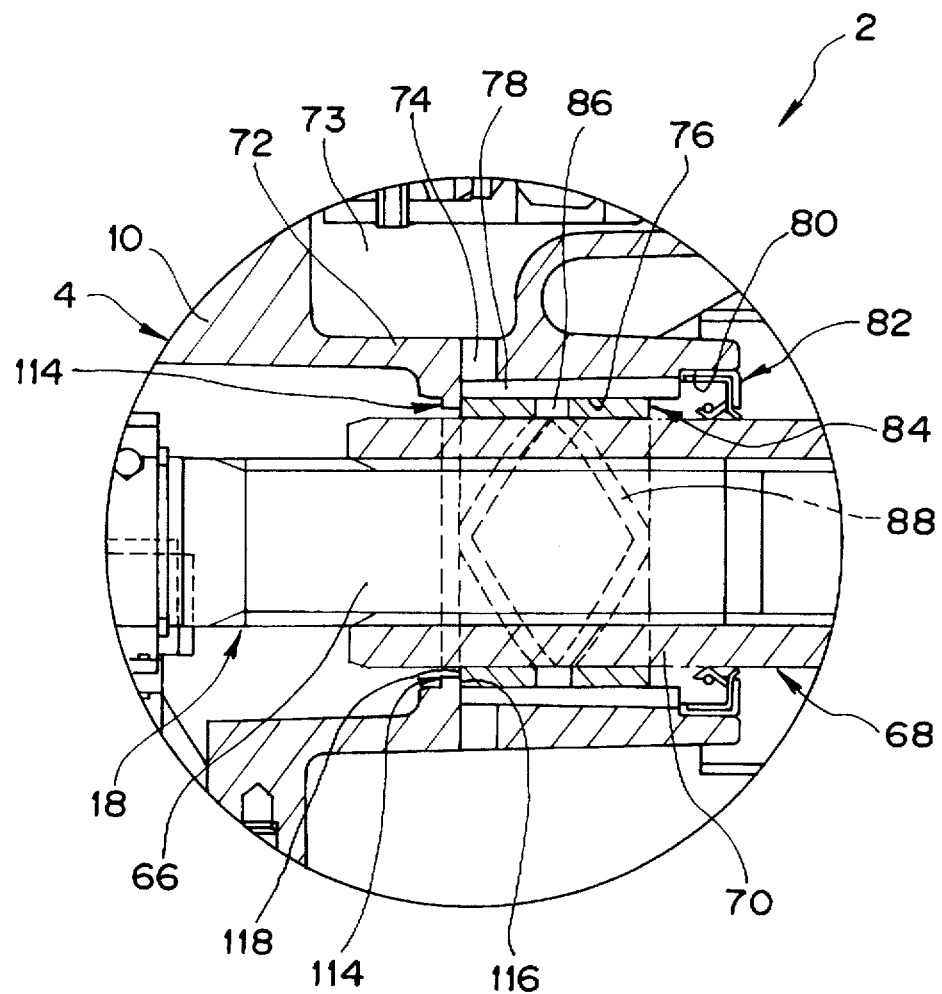
FIG. 1 is an enlarged cross-sectional view showing the section indicated by the arrow I in FIG. 2 and showing a first embodiment of the lubrication structure for a transfer mechanism according to the present invention.
Figure 2:
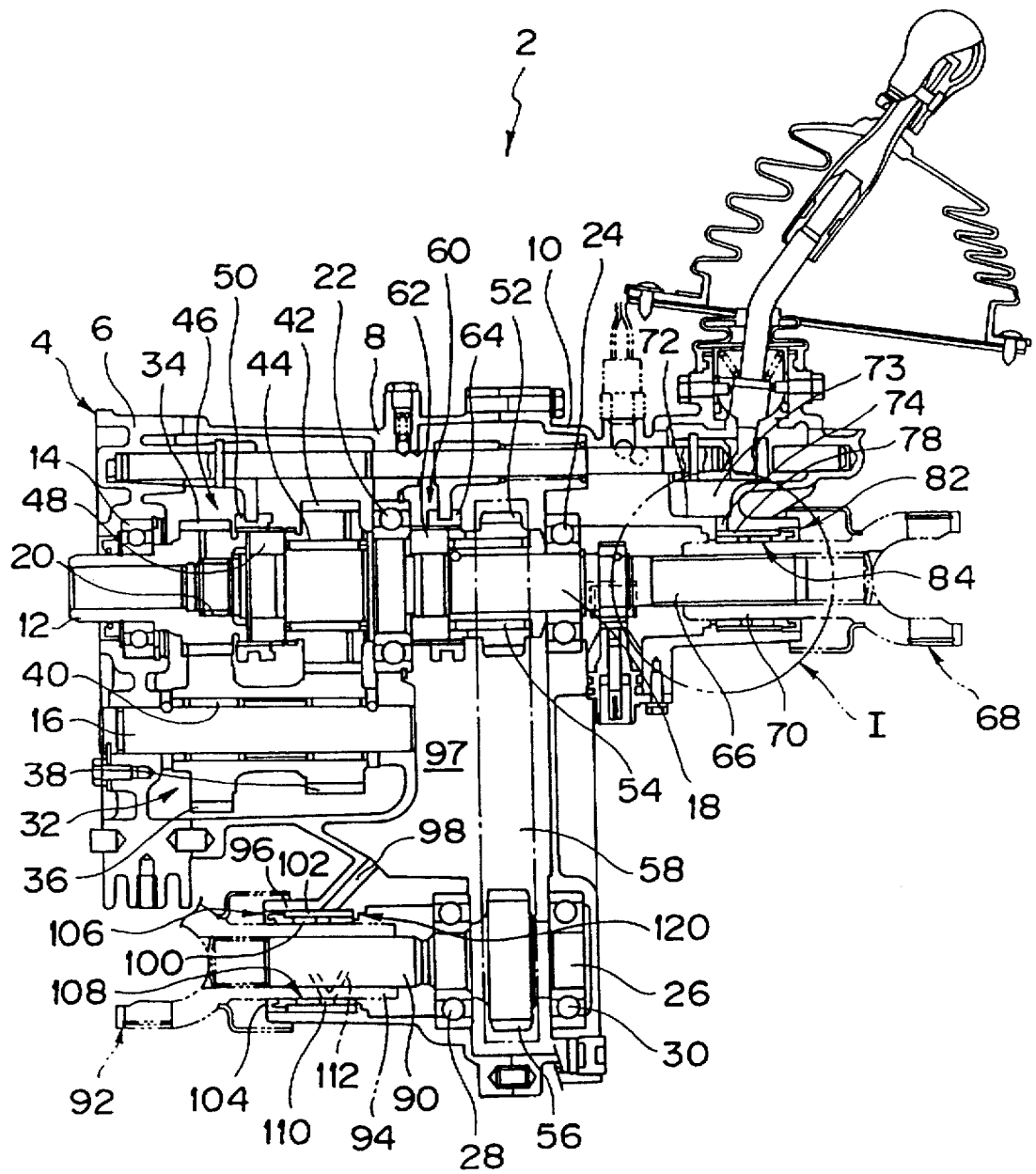
FIG. 2 is a cross-sectional view of a transfer mechanism.
Figure 7:
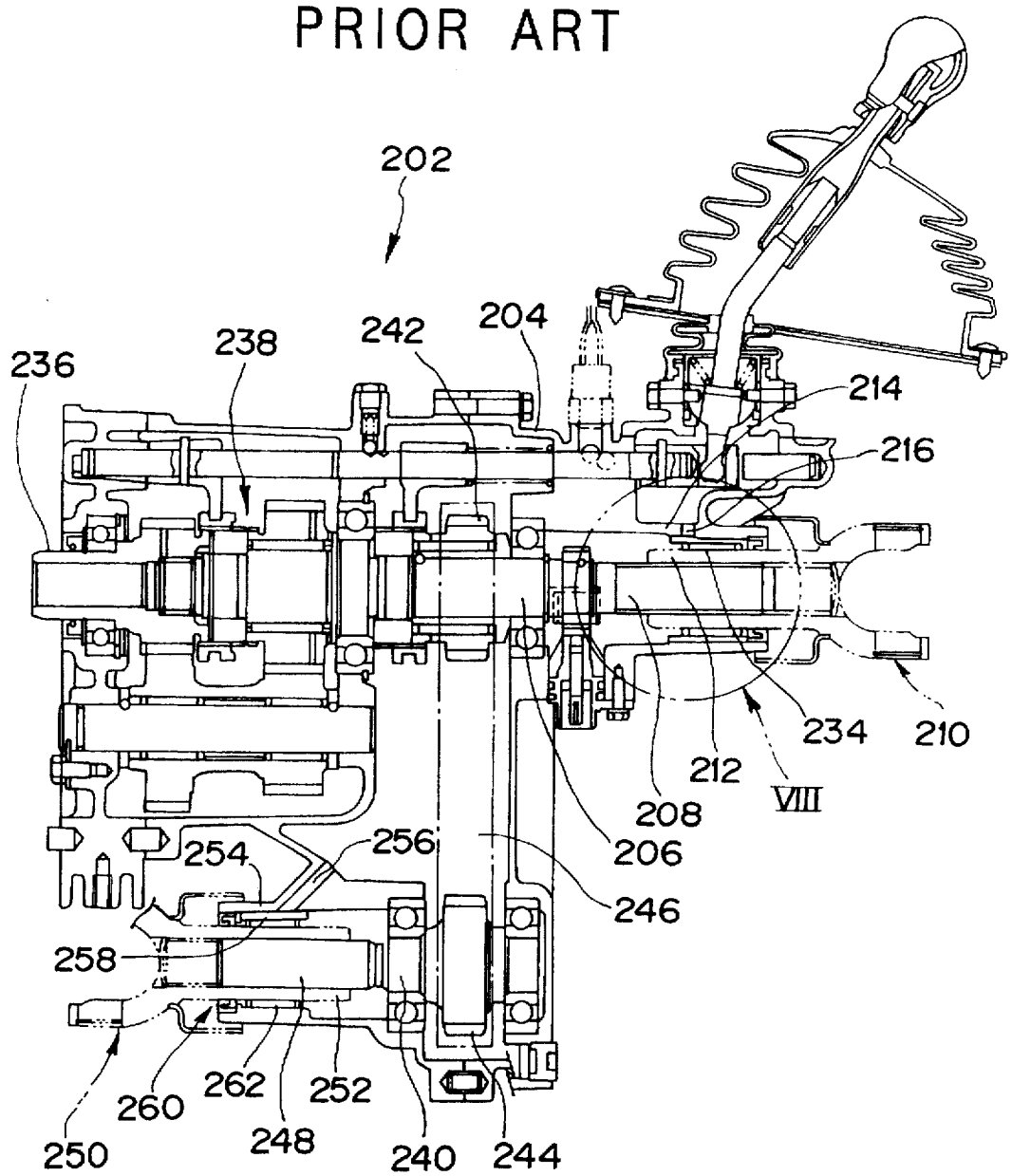
FIG. 7 is a cross-sectional view showing a conventional transfer mechanism.
Figure 8:
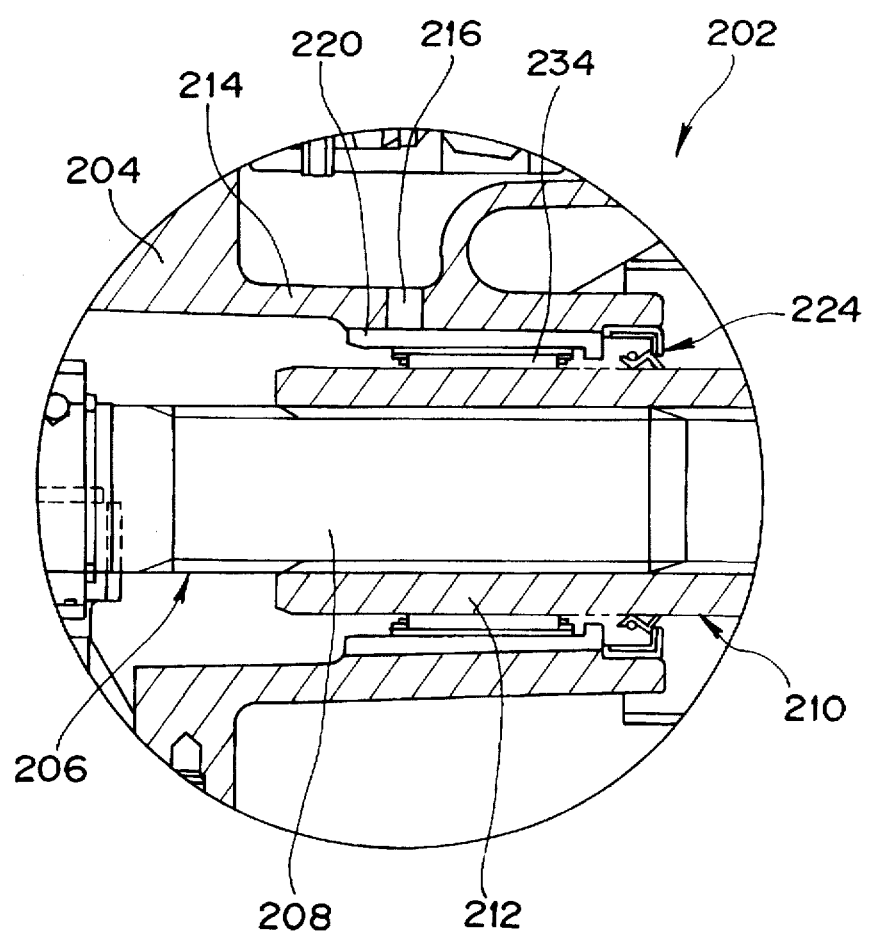
FIG. 8 is an enlarged cross-sectional view showing a section indicated by the arrow VIII in FIG. 7.

FIG. 1 and FIG. 2 show a first embodiment of the present invention. In FIG. 2, the reference numeral 2 indicates a transfer mechanism. The transfer mechanism 2 is linked to a transmission gear (not shown) of an internal combustion engine located in its vertical posture in a front of a four-wheel vehicle (not shown). The housing or case 4 for the transfer mechanism 2 is formed in first to third case sections 6, 8 and 10.

The transfer mechanism 2 rotatably supports an input shaft 12 via a bearing 14 within the first case section 6; mounts a counter shaft 16 provided in parallel to the input shaft 12 within the first and second case sections 6, 8; rotatably supports a rear output shaft 18 aligned in series with the input shaft 12 via a first rear bearing 20 positioned within rear end of input shaft 12 and also via second and third rear bearings 22, 24 positioned within the second and third case sections 8, 10; and rotatably supports a front output shaft 26 in parallel with the rear output shaft 18 via first and second front bearings 28, 30 positioned within the second and third case sections 8, 10.

The front end of input shaft 12 is connected in series to an output shaft of a transmission (not shown), and the other end is rotatably supported by the first rear bearing 20 on the front end of the rear output shaft 18. An array of low-speed/high-speed switch gears 32 is provided inside the first and second case sections 6, 8. In the array of low-speed/high-speed switch gears 32, an input gear 34 is fixed to a rear end of the input shaft, first and second counter gears 36, 38 monolithically formed are rotatably supported via a counter bearing 40 on the parallel counter shaft 16, and an output gear 42 is rotatably supported via an output shaft bearing 44 on a front end of the rear output shaft 18. The input gear 34 is engaged with the first counter gear 36. The second counter gear 38 is engaged with the output gear 42.

A low-speed/high-speed switch mechanism 46 is provided between a rear end of the input shaft 12 and a front end of the rear output shaft 18. The low-speed/high-speed switch mechanism 46 has a low-speed/high-speed switch hub 48 fixed in the rear end of output shaft 18, and a low-speed/high-speed switch sleeve 50 surrounds the low-speed/high-speed switch hub 48 and is mounted thereon so that it can move in the axial direction but cannot rotate relative to hub 48.

The low-speed/high-speed switch mechanism 46 switches to a high-speed engagement state by connecting the rear output shaft 18 to the input shaft 12 via the low-speed/high-speed switch sleeve 50, and also switches to a low-speed engagement state by connecting the output gear 42 to the rear output shaft 18 via the low-speed/high-speed switch sleeve 50.

A driving sprocket 52 is rotatably supported via a driving bearing 54 on the rear output shaft 18. A driven sprocket 56 is fixed on the front output shaft 26. A chain 58 is wound around the driving sprocket 52 and the driven sprocket 56.

A two-wheel/four-wheel switch mechanism 60 is provided at the rear output shaft 18. The two-wheel/four-wheel switch mechanism 60 has a two-wheel/four-wheel switch hub 62 fixed to the rear output shaft 18 and a two-wheel/four-wheel switch sleeve 64 provided on the two-wheel/four-wheel switch hub 62 in a state in which it can move in the axial direction but cannot rotate relative to the hub 62.

The two-wheel/four-wheel switch mechanism 60 selects the four-wheel driving mode to distribute driving force to the rear and front output shafts 18, 26 by connecting the driving sprocket 52 with the two-wheel/four-wheel switch sleeve 64, and selects the two-wheel driving mode to output driving force only to the rear output shaft by releasing or disengaging the driving sprocket 52 from the two-wheel/four-wheel switch sleeve 64.

In the transfer mechanism 2, a rear slide shaft section 66 is provided in a rear end section of the rear output shaft 18. The rear slide shaft section 66 has a rear slide tube section 70 for a rear sliding yoke 68 provided on a rear propeller shaft (not shown) engaged therein from the outside in the state in which it can move in the axial direction but cannot rotate. The third case section 10 has a rear extended section 72 engaged therewith from outside so that it covers the rear slide shaft section 66.

In the rear extended case section 72, as shown in FIG. 1, a lubricating oil hole 74 communicating to an oil pool chamber 73 is provided, and an elongated keyway-shaped lubricating oil groove 78 communicating with the lubricating oil hole 74 and oriented in the axial direction of the rear extended section 72 is provided on an internal annular surface 76 thereof. At the outer end of the internal surface 76 of the rear extended section 72, a circular staged or stepped mounting section 80 continuous in the peripheral direction of the internal surface 76 is provided. A seal mechanism 82 for sealing is engaged directly between the staged mounting section 80 and the rear slide tube section 70.

Between the rear extended case section 72 and the rear slide tube section 70, a rear bushing 84 is provided and set for centering the rear slide section 70. The rear bushing 84 is positioned so that it covers a ceiling side of the lubricating oil groove 78.

An oil hole 86 and an oil groove 88 are provided in the rear bushing 84. The lubricating oil led from the lubricating oil hole 74 in the rear extended section 72 to the lubricating oil groove 78 is guided from the oil hole 86 to the oil groove 88, and lubricates the region between the rear bushing 84 and the rear slide tube section 70.

The transfer mechanism 2 has the front output shaft 26 formed like the rear output shaft 18. Namely a front slide shaft section 90 is provided in the front end section of the front output shaft 26, a front slide tube section 94 for a front sliding yoke 92 of a front propeller shaft (not shown) is engaged from outside in the front slide shaft section 90 in the state where it can move in the axial direction but cannot move relatively against the front slide shaft section 90, and a front extended section 96 is formed and provided in the second case section 8 of the transfer mechanism 2 so that it covers the front slide shaft section 90.

A lubricating oil hole 98 communicating with an oil pool chamber 97 is formed in the front extended section 96, a lubricating oil hole 102 communicating with the lubricating oil hole 98 and oriented in the axial direction of the front extended section 96 is formed on an internal surface 100 thereof, and in the circular staged mounting section 104 formed at the outer end of the internal surface 100 of the front extended section 96, a seal mechanism 106 for sealing between the staged section 104 and the front slide tube section 94 is provided.

Between the front extended section 96 and the front slide tube section 94, a front bushing 108 is provided so that it covers a ceiling of the lubricating oil groove 102, and an oil hole 110 and an oil groove 112 are provided in the front bushing 108. Lubricating oil led from the lubricating oil hole 98 in the front extended section 96 to the lubricating oil groove 102 is led from the oil hole 110 of the front bushing 108 to the oil groove 112, and lubricates the region between the front bushing 108 and the front slide tube section 94.

A lubrication structure for the transfer mechanism 2 closes an edge of the lubricating oil groove at the inner end of the extended section, and an edge of the lubricating oil groove orientated toward the seal mechanism is opened. It should be noted that, as the rear extended section 72 has the same construction as that of the front extended section 96, the description is made herein for the rear extended section 72 as shown in FIG. 1.

In the first embodiment of the present invention, as shown in FIG. 1, a projecting annular flange 114 having a circular form is formed on casing section 10 and provided at the inner end of the rear extended case section 72. The projecting flange 114 has a height sufficient to close an inner end or edge of the lubricating oil groove 78 at the inner end of the rear extended case section 72, and also to project radially inwardly from the internal annular surface 76 of the rear extended section 72 toward the rear slide section 70, and has a circular form continuous in the peripheral direction of the internal surface 76.

The rear bushing 84 has a sleeve like cylindrical form and has an edge face 118 maintained in snug abutting contact with a longitudinally-oriented side face 116 of the projecting flange 114. When the rear bushing 84 is positioned between the rear extended case section 72 and the rear slide section 70, it covers the lubricating oil groove 78. When the edge of the rear bushing 84 in its longitudinal direction is pressure-engaged with the side face of the projecting flange 114, the rear bushing 84 closes the lubricating oil groove 78 at the inner end of the rear extended section 72. An edge or end of the lubricating oil groove 78 at the outer end of the rear extended case section 72 as oriented toward the seal mechanism is open.

As described above, the lubrication structure for the transfer mechanism 2 can close an edge of the lubricating oil groove 78 at the inner end of the rear extended case section 72 when an edge of the rear bushing 84 in its longitudinal direction is in snug contact or engagement with the side face 116 of the projecting flange 114. An inner edge section of the lubricating oil groove 78 as formed at the inner end of the rear extended section 72 is thus closed by the projecting flange 114 and the rear bushing 84. However, an edge of the lubricating oil groove 78 at the outer end of the rear extended section 72 oriented toward the seal mechanism 82 is opened, so that even in a situation where the oil hole 86 of the rear bushing 84 is axially offset relative to the lubricating oil hole 74 of the rear extended section 72, it is possible to prevent lubricating oil from escaping from an inner edge of the lubricating oil groove 78 at the inner end of the rear extended case section 72.

For this reason, the lubricating capability of the rear sliding yoke 68 can be insured with the rear bushing 84, and without providing a bearing in the lubrication structure for the transfer mechanism 2 as is the conventional technology, and burning and/or wear can be prevented or minimized, and cost reduction can be achieved by eliminating a bearing and by insuring the lubricating capability with the rear bushing. Also with the improvement in the lubricating capability, the lubrication structure can contribute to improvement of the seal function and rigidity of bearing, prevention of attenuation due to vibration, and prolonging of service life.

It should be noted that, in the transfer mechanism 2, the lubricating oil groove is closed at an inner end of the front extended section 96, and also has a flame height projecting from the internal surface 100 of the front extended section 96 toward the front tube section 94. A projecting flange 120 having a circular form and continuous in the peripheral section of the internal surface 100 of the front extended section 96 is provided. An edge of the lubricating oil groove 102 at the inner end of the front extended section 96 is closed by snugly engaging or contacting an edge face of the front bushing 108 in its longitudinal direction against a side face of the projecting flange 120. An edge of the lubricating oil groove 102 at the outer end of the front extended section 96 oriented toward the seal mechanism 106 can be opened.

Figure 3:
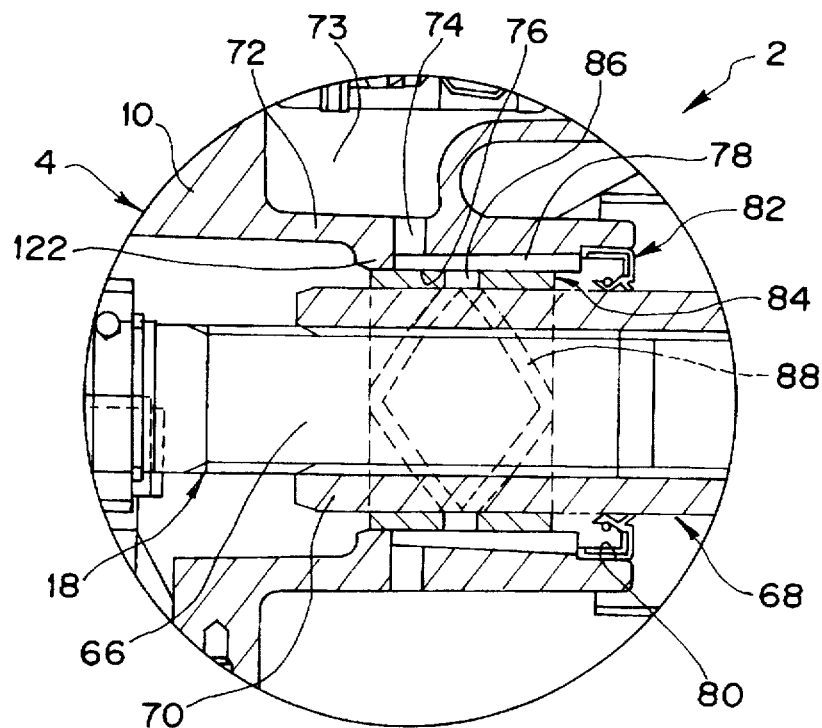
FIG. 3 is an enlarged cross-sectional view showing a variation of the first embodiment.

FIG. 3 shows a variation of the first embodiment of the present invention. In this variation, an inner edge or end of the lubricating oil groove 78 at the inner end of the rear extended section 72 is closed, and a dam or shoulder section 122 having a height reaching the internal surface 76 is provided.

With the section 122 according to this variation, similar effects like those in the first embodiment described above can be achieved because an inner edge of the lubricating oil groove 78 at the inner end of the rear extended section 72 is closed by section 122. But since the height of the section 122 is not enough to project inwardly beyond the internal surface 76, but rather engages the outside of the bushing 84, the manufacture of the rear extended section 72 is easy.

Figure 4:
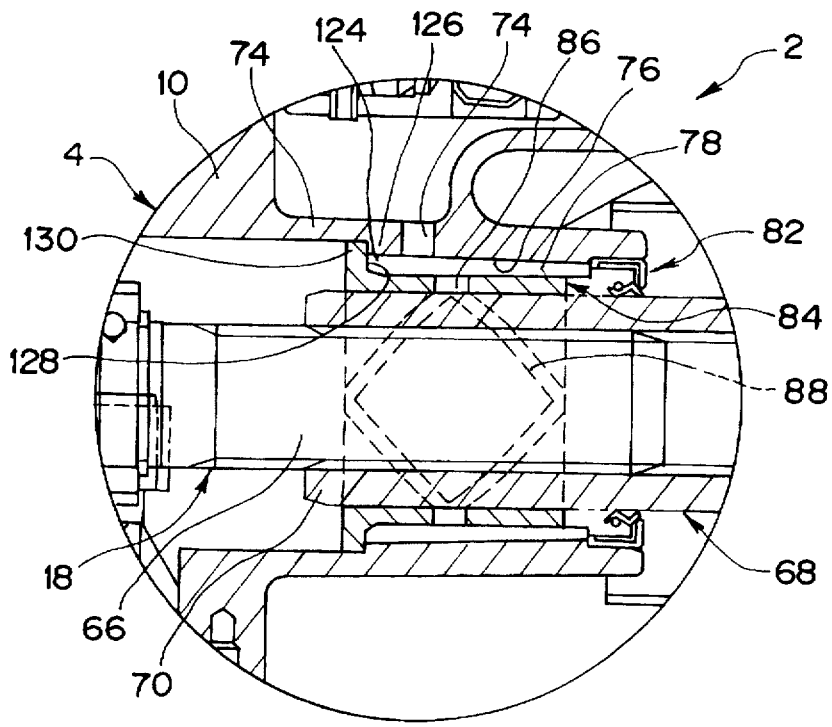
FIG. 4 is an enlarged cross-sectional view showing a second embodiment of the lubrication structure for a transfer mechanism.
Figure 5:
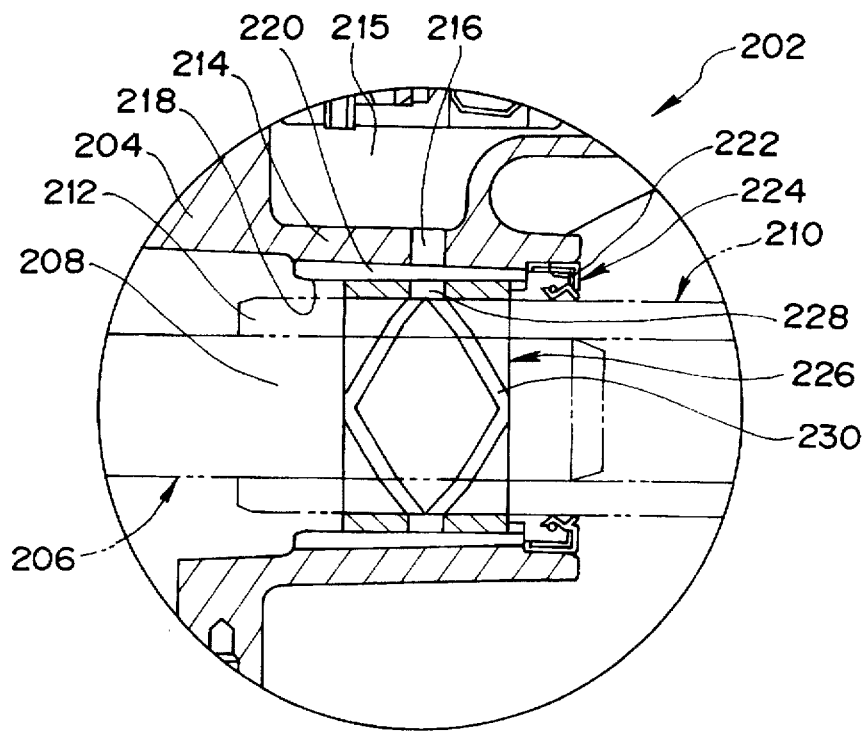
FIG. 5 is an enlarged cross-sectional view showing a conventional type of lubrication structure for a transfer mechanism.
Figure 6:
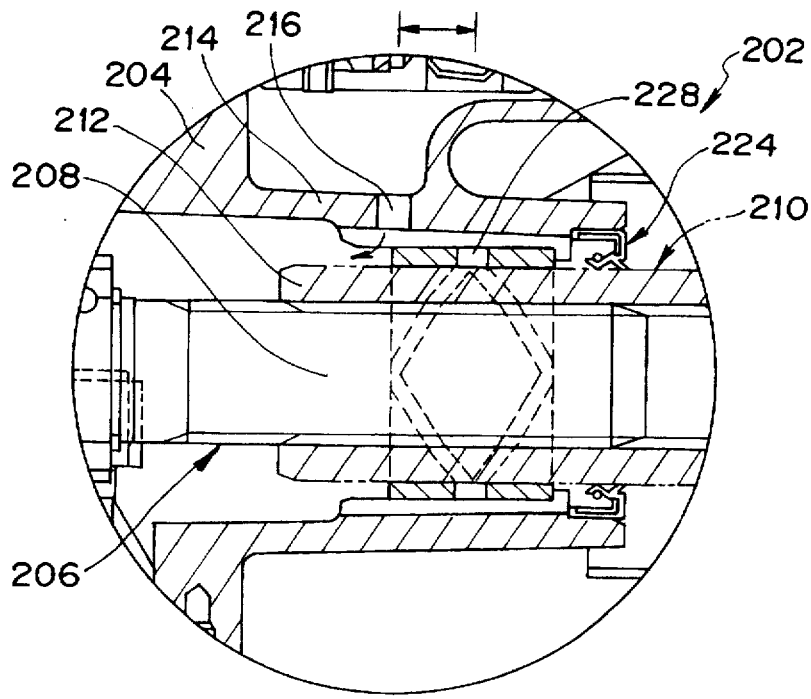
FIG. 6 is an enlarged cross-sectional view showing a state where an oil hole is offset.

FIG. 4 shows a second embodiment of the present invention. The second embodiment is characterized in that an edge of the lubricating oil groove 78 at the inner end of the rear extended case section 72 is open, and a staged or stepped section 126 having a circular edge face 124 continuous in the peripheral direction of the rear extended section 72 is provided. A radially outwardly projecting brim or flange section 130 having a circular face 128 closing an inner edge of the lubricating oil groove 78 at the inner end of the rear extended section 72 is provided on one edge of the rear bushing 84 in its longitudinal section.

With the second embodiment, an edge of the lubricating oil groove 78 at the inner end of the rear extended section 72 can be closed by snugly engaging or contacting the face 128 of the projecting brim section 130 of the rear bushing 84 against the edge face 124 of the staged section 126 at the inner end of the rear extended section 72 of the lubricating oil groove section 78. Thus the effects similar to those in first embodiment can be achieved, and also an edge of the lubricating oil groove 78 at the inner end of the rear extended section 72 can be closed more accurately by the projecting brim section 130 of the rear bushing 84.

As described above, in the lubrication structure for a transfer mechanism according to the present invention, an edge of a lubricating oil groove at the inner end of the extended section, the lubricating oil groove formed in the extended section, is closed, and the other edge of the lubricating oil groove is opened, so that a lubricating oil does not escape from an edge of the lubricating oil groove at the inner end of the extended section.

Because of the features as described above, the lubrication structure for a transfer mechanism can insure a lubricating capability of a sliding yoke with a bushing and without providing a bearing therein, can prevent burning, enables cost reduction by insuring the lubricating capability with a bushing and without providing a bearing, and can contribute to improvement of the seal function, rigidity of bearing, prevention of attenuation vibration, and insures a low-noise profile and a long service life.

What is claimed is:

1. A lubrication structure for a transfer mechanism which distributes a driving force received from a transmission gear to two output shafts for outputting the driving force therefrom, comprising: a slide tube section for a yoke provided on a propeller shaft, said slide tube section being axially movably and nonrotatably coupled to a shaft section of said output shaft; a lubricating oil hole formed in an extended section of a transfer mechanism case covering said slide shaft section; a lubricating oil groove provided in an internal surface of said extended section and communicating with said lubricating oil hole, said lubricating oil groove being oriented in an axial direction of said extended section; a seal mechanism sealing between said slide tube section and an internal surface of said extended section at an outer end thereof; and a bushing provided between said extended section and said slide tube section so that the bushing covers said lubricating oil groove; and a first edge of said lubricating oil groove positioned adjacent an inner end of said extended section being closed and a second edge of said lubricating oil groove provided at an outer end of said extended section being open.

2. The lubrication structure according to claim 1, wherein a first edge of said lubricating oil groove is closed by a circular radially projecting flange, said circular projecting flange having a height which projects radially inwardly from an internal surface of said extended section to a position adjacent said slide tube section and which is continuous in a peripheral direction of said internal surface, and a longitudinal edge face of said bushing is maintained in snug contacting engagement with a side surface of the projecting flange.

3. The lubrication structure according to claim 1, wherein said first edge of said lubricating oil groove is closed by a circular radially projecting brim section fixed to an inner longitudinal edge of said bushing.

4. In a transfer mechanism for a vehicle for distributing driving force received from a transmission gear to an output shaft for outputting the driving force therefrom, the transfer mechanism including a transfer case, said output shaft being rotatably supported on the case and including a shaft section which is axially stationarily mounted relative to the case and a tube section which is nonrotatably but axially slidably mounted on said shaft section and is provided with a connection on an outer end thereof adapted for joining to a yoke of a propeller shaft, said transfer case including an extended case section which includes an axially projecting sleeve part which surrounds said tube section, and a rear sleeve like bushing disposed between the sleeve part of said extended case section and said slide tube in surrounding relationship to said slide tube, said sleeve part of said extended case section having a lubricating oil hole formed therethrough and at one end communicating with an oil reservoir formed in said transfer case, said oil hole at an inner end communicating with an axially elongate oil groove which extends along an inner annular surface of said sleeve part, said bushing being disposed within and substantially in contacting engagement with said inner annular surface so that the bushing extends circumferentially across said groove, said bushing having a oil passage extending radially therethrough for communication at a radially outer end thereof with said groove and for communication at a radially inner end thereof with an annular interface area defined between said bushing and said slide tube, a seal mechanism cooperating between said slide tube and the sleeve part of said extended case section adjacent an outer end of said bushing, said seal mechanism being disposed outwardly from an outer end of said groove, the outer end of said groove being in open communication with a region defined axially between said seal mechanism and an adjacent outer end of said bushing, and an inner end of said bushing being in contacting engagement with said case for closing off the inner end of said groove.

* * * * *